Sept. 22, 1970     R. A. RICHARD     3,529,892
EXPANDED PERSPECTIVE PHOTOGRAPHY METHOD AND APPARATUS
Filed Aug. 21, 1968     2 Sheets-Sheet 1

INVENTOR.
ROGER A. RICHARD
BY
Crowley, Kiely + Stevens
ATTORNEYS

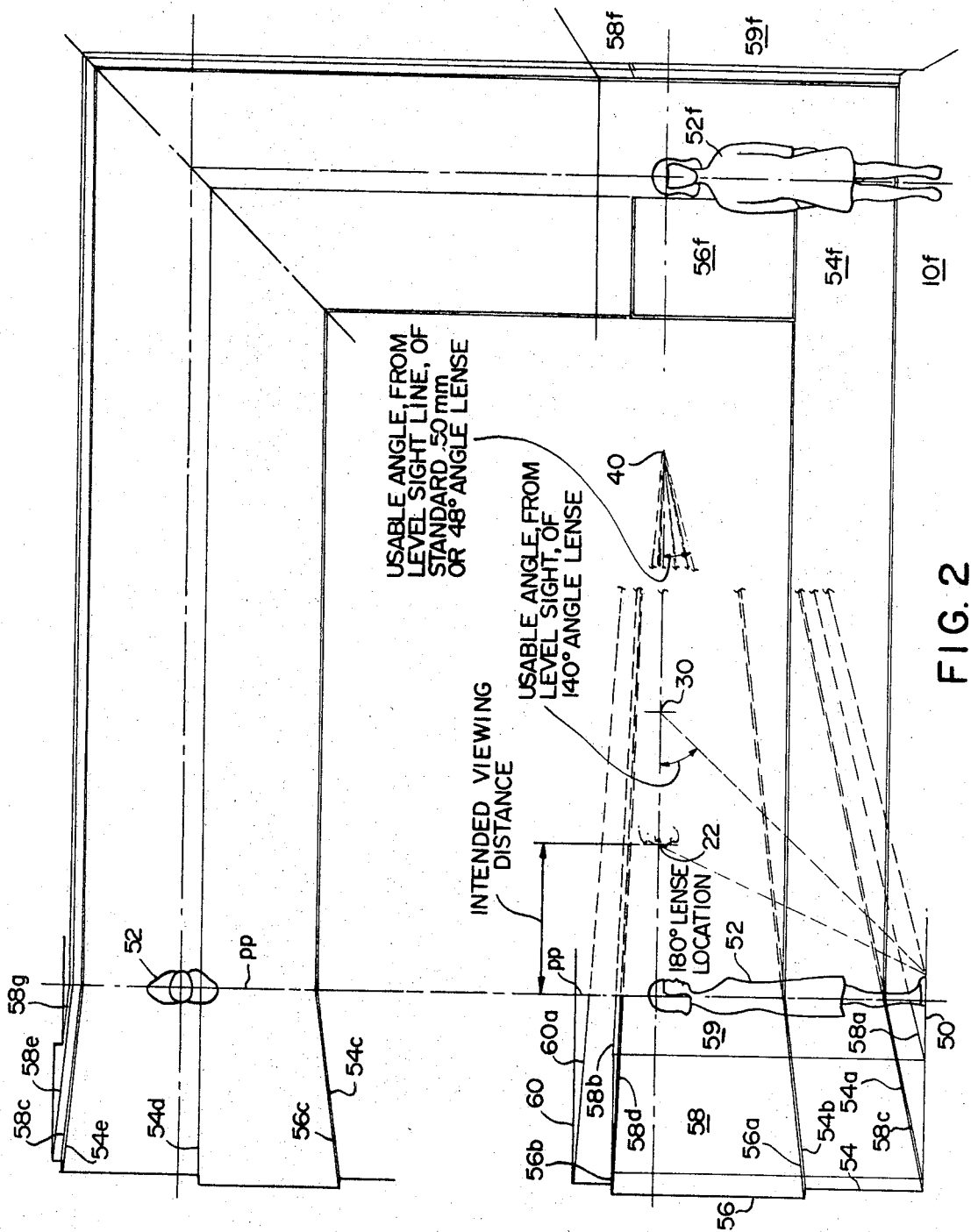

United States Patent Office 3,529,892
Patented Sept. 22, 1970

3,529,892
EXPANDED PERSPECTIVE PHOTOGRAPHY METHOD AND APPARATUS
Roger A. Richard, 456 Beacon St., Boston, Mass. 02150
Filed Aug. 21, 1968, Ser. No. 754,392
Int. Cl. G03b 27/68
U.S. Cl. 355—77        6 Claims

ABSTRACT OF THE DISCLOSURE

A photographic image free from distortion and in correct perspective is produced by photographing an image using a lens having a light acceptance angle of at least 170°. The thus-formed image is then projected through a lens equivalent to the one used to record the image.

---

This invention is directed to photography and, more particularly, to a method of photography wherein the photographed image is distortion-free and has correct perspective particularly with relation to the correct viewing distance.

BACKGROUND OF THE INVENTION

The problem of obtaining proper perspective with relation to a viewer in photography has heretofore been unsolvable. The contrast between large and small objects is lost to a great extent; the greater the distance from the observer, the smaller an object will appear with relation to objects nearer the viewer. In many instances, an object must be photographed from a considerable distance to encompass the entire subject, but this movement of the camera away from the subject results in the loss of depth with the impression of flatness in the resulting photograph wherein the subject appears to be in the same plane as the background when, in fact, this is not the case.

Photography lacks depth primarily due to the fact that objects are not in proper perspective proportion in relationship to each other, i.e., objects parallel to the line of sight, or objects with lines running away from the viewer, appear smaller on the two-planed surface of the photograph than objects perpendicular to the line of sight.

The phenomenon of objects nearer the camera appearing out of proportion, i.e., smaller, with respect to objects further away from the camera is illustrated in FIG. 2 wherein the magnification encountered in conventional photography results in the enlarging of the background in relation to the foreground. The person also appears to be against a wall to the rear of the subject, even though the distance may be several feet between the subject and the wall, providing a two-dimensional effect or a "flattening" to the image. Similarly, objects on the wall will appear much larger to the viewer in proportion to the subject even though they are still further from the camera.

To correct to a degree, for the loss of depth, wide-angled lenses have been used. However, while introducing some depth into the image, the photograph still lacks correct perspective at the intended viewing distance. In attempting to correct for depth other aspects of distortion are introduced in the image, i.e., barrell distortion and a shortening of the lines at the edges of the image. When the light acceptance angle of the particular lens exceeds about 120°, an increasing degree of spherical distortion is introduced. Thus, a camera having an 140° light acceptance angle will produce an image wherein lines on the extremes of the image become curved. This phenomenon would be illlstrated in a group photograph of people wherein the heads of the people closer to the margins would appear ellipitical in shape. The so-called fish-eye lens, which has a light acceptance angle of 180°, produces an image wherein all straight lines assume a curve. The us of such a camera has been limited substantially to outdoor panoramic scenes. Because of the large degree of cylindrical perspective, such a lens has been considered useless in architectural photography.

The use of photography in architecture, in fact, is negligible. Because of the distance the camera has to be located from the subject, it is impossible to obtain the proper perspective between objects to the viewer. The use of photography in architecture would be greatly enhanced if one could photograph an outside location, producing an image with the correct perspective relationship between the items photographed, to a viewer observing the image as though he were within the space photographed so that a proposed building, for example, could then be sketched in on the photograph to ascertain visually and easily the proper relationship between the proposed building and the existing structures. Similarly, if a designer could photograph a room and if each window, door, and other object in the room were in correct perspective with relationship to each other and with relationship to the viewer, decorating and designing could be planned by virtue of the photograph without the necessity of preparing scale models.

A novel method of photography has now been found which permits the preparation of images in correct perspective with respect to the viewer.

BRIEF SUMMARY OF THE INVENTION

The novel method of the present invention comprises photographically recording an image on a photographic negative, e.g., a silver halide emulsion layer, from the desired viewing distance using a lens having a light acceptance angle of at least 170° and projecting the transmitted light from said image through an equivalent lens system to produce a photograph wherein all objects within the cone of vision are in correct perspective and relationship with respect to the viewer, thus producing a photographic image which provides the viewer with the impression that he is actually at the location photographed, and without the distortion commonly associated with such wide-angle lens. The entire image photographed may be viewed or only a portion thereof. In either case, the image viewed will be in proper perspective.

The novel method of the present invention, therefore, provides a distortion-free image which can be viewed from the same relative distance as the camera was located from the subject possessing the proper feeling of depth wherein the background is in correct relationship to the subject imparting a three-dimensional quality to the photograph. At present, this cannot be achived with conventional systems since one must view a photograph from a distance greater than the intended viewing location, i.e., within the space photographed, thus, the impresssion of looking into a photographed area from a distance greater than that at which it was photographed is achieved.

Attempts to impart correct perspective and eliminate distortion from photographed images from 48° to 140° angle lenses have not been successful since these lenses are providing a magnification of the image and requires that the camera be loacted at a distance too far from the object to provide the desired depth. As you move away from the subject, the relative distance between the objects photographed diminishes and, thus, the various objects are not in proper perspective relationship to each other.

BRIEF DESCRIPTION OF THE DRAWINGS

FIG. 2 is a diagrammatic showing of the preparation of a photographic image employing prior art methods.

DETAILED DESCRIPTION OF THE DRAWINGS

Figure 1:
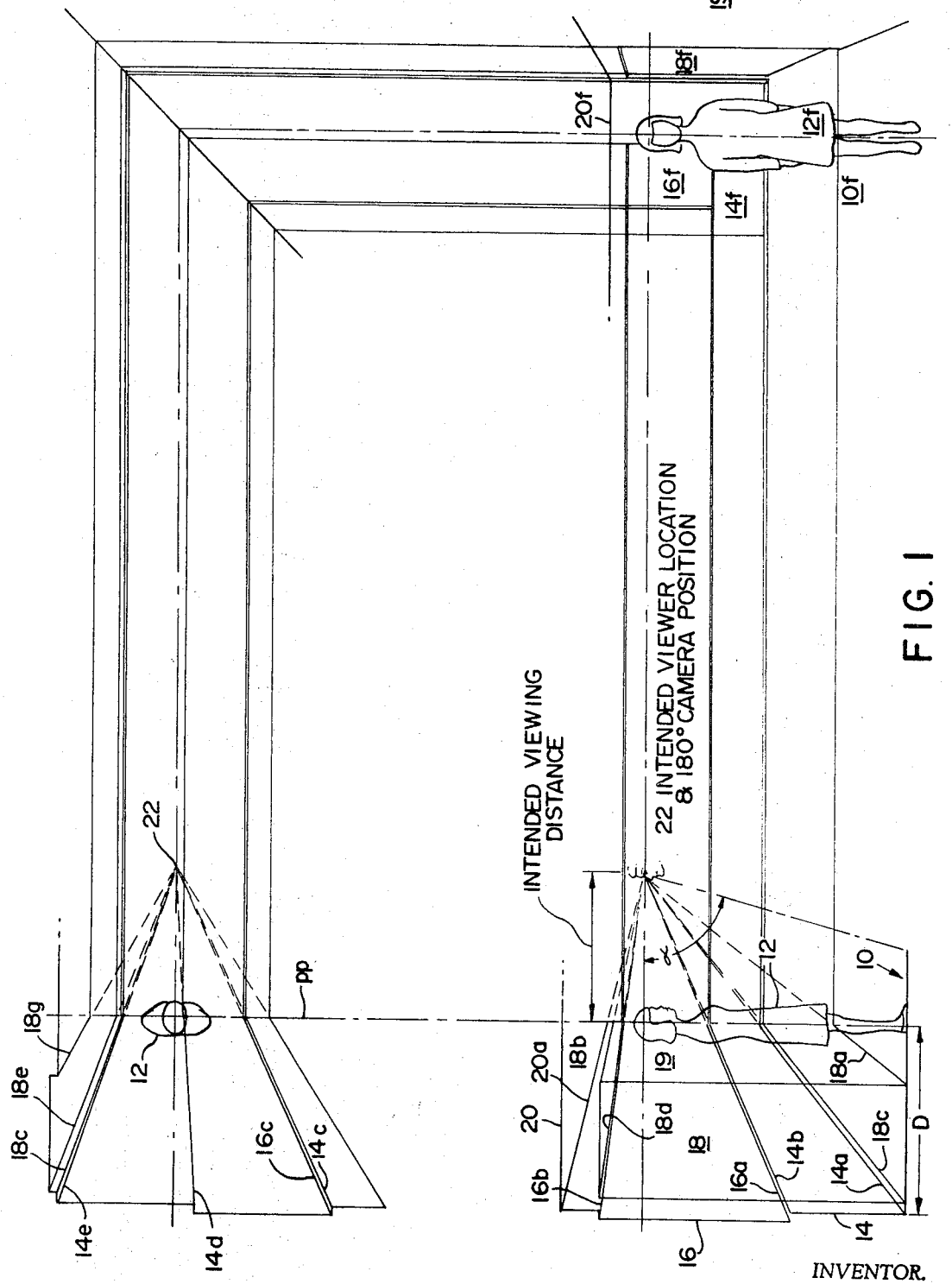
FIG. 1 is a diagrammatic showing of a photographic image prepared in accordance with the system of the present invention.

Referring now to FIG. 1, there is illustrated in plan and elevation views location 22 of the camera employing a 180° lens and which also indicates the intended viewer location of the finished image. The usable angle of the 180° lens from the horizontal is 70° (approximately) and is indicated as angle α. This angle corresponds to the normal human viewing angle from the horizontal. By virtue of this angle, the location of the camera to the subject can be relatively close and still encompass the entire desired scope of the image. The photographed subject includes the figure of the woman 12 on floor 10, located distance D from wall 14 and window 16. To the left of the figure is side wall 19 having a door 18 located therein. By extending image rays 14a, 14b, 14c, 14d, 14e, 16a, 16b, 16c, 18a, 18b, 18c, 18d, 18e, 18g and 20a through the picture plane PP and thence horizontally to indicate the perspective image as photographed and projected by the method of the present invention to produce the women 12f in relation to floor 10f, rear wall 14f, window 16f, ceiling 20f, side wall 19f and door 18f, in proper perspective; that is, with the feeling of depth and with the impression of viewing the subject from the same distance as photographed.

Referring now to FIG. 2, the same subjects are photographed according to the prior art methods employing a standard 50-millimeter lens 40 having a 48° angle of light acceptance. The same subjects in the same locations are photographed but for purposes of clarity are indicated by new reference figures, i.e., woman 52, floor 50, rear wall 54, window 56, side wall 59, doorway 58 and ceiling 60. It will be noted that in order to include the entire scene in the photographic image, it is necessary to locate the camera 40 at a considerable distance from the subject to be photographed due to the shallow angle of light acceptance with such a lens. By extending the image rays 54a, 54b, 54c, 56a, 56b, 56c, 58a, 58b, 58c, 58d, 58e and 58g and 60a, through a picture plane PP and then extending them horizontally to indicate the image represented by figures 52f, 10f, 54f, 56f, 58f and 59g.

It will be noted that in FIG. 2 the visible area of the door was decreased substantially and the entire image has taken on an impression of flatness, that is, woman 52f appears to be in the same plane as window 56f and wall 54f and adjacent to a doorway 58f when, in fact, woman 52 is located some distance in front of both door 58 and the rear wall 54. A magnification is also noted in the image formed with the 50 millimeter lens. The window 56f is large with respect to woman 52f; thus, it is not in correct perspective with relation to woman 52f resulting in the loss of depth and the distortion of the image.

Comparing the image produced in FIG. 2 with the image produced in FIG. 1, it will be noted that a greater portion of the doorway 18f is visible in FIG. 1 as a result of the wide angle lens employed at the relatively close distance, i.e., the intended viewer distance. Similarly, the window has assumed the proper proportion in relationship to the other objects in the scene thus providing the depth or three-dimensional quality desired.

In a preferred embodiment of the present invention, a standard 180° lens (i.e., a so-called fish eye lens) on a single lens camera body was employed. For example, a Rokkor 18-millimeter, f 9.5 lens having a light acceptance angle of 180° was mounted on a Minolta 35-millimeter camera. The entire frame of the film was used. The space or object is photographed in the direction and at the distance desired. In order to maintain parallel vertical lines in the final image, it is preferred that the camera is held in a level position. If the camera is not held in the specified level position, this can be corrected by tilting the viewing screen or projector, if a negative transparency is employed, or the positive image. After the negative has been developed, if a transparency is employed, the transparency inserted into a projector. If a conventional projector was employed, the expected spherical distortion of an ultra-wide lens would be encountered. However, the projector lens employed in the present invention is the same lens as employed in photographing the subject initially and the light is thus projected through the lens in a direction opposite to the direction the light traveled when the image was formed in the camera. The thus-projected image would be undistorted and in correct perspective.

In preparing undistorted, correct perspective, positive prints from the negative, an enlarger is employed using the same lens as was employed in the camera initially.

In projecting the image, either by a conventional projector or by an enlarger employing the wide angle lens, the image is projected, and brought into focus, onto a flat plane, perpendicular in all directions to the center line of projection as is normally done when printing photographs. The distance between the projector and the screen is preferably equal to the intended viewing distance by the viewer of the image, so that the normal wide angle perspective composition is achieved. When the image is viewed, all objects appear to be in correct perspective with respect to the viewer, providing the impression to the viewer of being in the location photographed.

The novel method of the present invention is also suitable for use with motion pictures. The subject is recorded on motion picture film employing a conventional camera with a lens having a light acceptance angle of at least 170°. The film is processed in a conventional manner and then projected on a flat screen employing a projector with the same wide angle lens employed in photographing the image initially. The projector is placed at a location from the screen which is approximately the midpoint of the intended audience. Since the distance between the camera recording the image and the subject is generally relatively small, by means of the present invention, it is possible to employ rear projection techniques, that is, locating the camera on the side of the screen opposite the side that the viewers are located. The image on the screen will be in correct perspective to the audience on either side of the line located a distance from the screen equal to the distance from the screen to the projector. It will also be in correct perspective and spherical distortion-free for viewers located at all but extreme angles from the center line of the screen.

In a specific example, employing a 100 foot wide screen, the projector could be located about 30 feet behind the translucent screen. The optimum viewing distance for the audience on the opposite side of the screen would be about 15 to 50 feet from the screen. However, the image would be in true perspective, providing the impression of depth for the viewers at substantially any distance, and including viewers located at an angle to the center line of the screen, whose line of sight would be at an angle to the plane of the screen. As in still photography, it may be desirable to use only a portion of the photographed image, e.g., 10–15%. In this case also, the portion viewed as well as the remainder of the image would be in correct perspective.

The terms "intended viewing distance," and "correct viewing distance," as used herein, refers to the distance between the viewer and the image. The distance is directly proportional to the distance from the lens of the camera to the subject photographed. Thus, an image smaller in size than the acutal subject would preferably be viewed from a proportionally closer distance than the actual distance of the camera from the subject when he image was initially recorded on the film.

Thus, by means of the present invention, perspective relationship is achieved without distortion whereby one views an image as though he were in the location photographed. For example, a photograph of a rectangular room including three of the four walls can be photographed and viewed as though the viewers were actually in the room by the method of the present invention. This would be impossible with conventional photography. In order to obtain sufficient scope to include three walls, it would be necessary to, in effect, remove the fourth wall and move the camera back a distance sufficient to include all the desired area, photograph the room and then enlarge the image. However, perspective correctness would not be obtained since such enlargement would result in a "flatness" of the image.

1. The method which comprises:
    recording photographically at least two images disposed in two different planes within the view being photographed on a negative using a first lens system having a light acceptance angle of at least 170°;
    projecting transmitted light from said negative image through a second lens system having substantially the same light acceptance angle as the first lens system onto an essentially flat surface;
    producing substantially distortion-free images in the correct perspective.

2. The method as defined in claim 1 wherein said lens has a light acceptance angle of 180°.

3. The method as defined in claim 1 wherein the viewing distance from said essentially flat surface is essentially the same as the relative distance from said negative to the subject photographed.

4. The method as defined in claim 1 wherein said projector is a photographic enlarger and said image is projected on photographic printing paper.

5. A photographic projection system comprising:
    a light source;
    a lense having a light acceptance angle of at least 170°;
    a transparency having at least two images recorded thereon, said images disposed in two different planes within the view photographed;
    means for locating the transparency between said light source and said lens; and
    an essentially flat surface for projecting said images thereon.

6. An apparatus as defined in claim 5 wherein said lens has a light acceptance angle of 180° and said transparency is a negative transparency.

References Cited

UNITED STATES PATENTS 2,857,805  10/1958  O'Brien.

OTHER REFERENCES

A. G. Ingalls, The Amateur Scientist, Scientific American, vol. 189, No. 6, December 1953.

NORTON ANSHER, Primary Examiner

RICHARD A. WINTERCORN, Assistant Examiner

U. S. Cl. X.R.

350—175, 198; 352—138; 355—152